(12) United States Patent
Alexander et al.

(10) Patent No.: US 7,885,914 B2
(45) Date of Patent: Feb. 8, 2011

(54) SYSTEMS, METHODS AND APPARATUSES FOR RANK COORDINATION

(75) Inventors: James W. Alexander, Hillsboro, OR (US); Son H. Lam, Puyallup, WA (US); Devadatta V. Bodas, Federal Way, WA (US); Krishna Kant, Portland, OR (US); Kai Cheng, Portland, OR (US); Ian M. Steiner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 11/965,955

(22) Filed: Dec. 28, 2007

(65) Prior Publication Data

US 2009/0171875 A1    Jul. 2, 2009

(51) Int. Cl.
*G06N 5/02*    (2006.01)
(52) U.S. Cl. ....................................... 706/46

(58) Field of Classification Search .................... 706/46
See application file for complete search history.

(56) References Cited

U.S. PATENT DOCUMENTS

| | | | | |
|---|---|---|---|---|
| 6,222,411 B1 * | 4/2001 | Chu et al. | ..................... | 327/295 |
| 6,819,337 B2 * | 11/2004 | Naegle | ........................ | 715/723 |
| 7,454,586 B2 * | 11/2008 | Shi et al. | ...................... | 711/167 |

* cited by examiner

*Primary Examiner*—Michael Holmes
(74) *Attorney, Agent, or Firm*—Philip A. Pedigo

(57) ABSTRACT

Embodiments of the invention are generally directed to systems, methods, and apparatuses for rank coordination. In some embodiments, a host includes rank coordination logic. The rank coordination logic may include performance measurement logic to measure a performance of a memory channel and dwell period control logic to select a length of a dwell period based, at least in part, on the performance of the memory channel. Other embodiments are described and claimed.

20 Claims, 4 Drawing Sheets

SYSTEMS, METHODS AND APPARATUSES FOR RANK COORDINATION

TECHNICAL FIELD

Embodiments of the invention generally relate to the field of information technology and, more particularly, to systems, methods, and apparatuses for rank coordination.

BACKGROUND

There are a number of control signals that are typically used to control synchronous dynamic random access memory (SDRAM). These control signals include a clock signal and clock enable signal (or simply CKE). In general, the commands used in SDRAM are timed relative to one or more edges of the clock signal. The CKE refers to a signal that enables or disables the clock signal. When the CKE is asserted an SDRAM responds to commands relative to one or more edges of the clock signal. When the CKE is de-asserted the SDRAM behaves as if the clock has stopped.

A chip select signal refers to another control signal frequently used in SDRAM systems. The chip select signal is used to select or deselect SDRAM devices. The term "rank" refers to a group of SDRAM devices that are tied to a particular chip select signal.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for rank coordination. The term "rank coordination" broadly refers to reducing power consumption, while remaining within a performance degradation envelope, by dynamically controlling the period of time that a memory controller dwells on a given rank of memory. This enables the memory controller to know how long the clock enable signal (CKE) can be de-asserted to the other ranks (and thereby reduce power consumption). As is further described below, in some embodiments, profiling logic is used to determine whether the performance of the memory channel is within a performance degradation envelop for a given dwell period.

Figure 1:
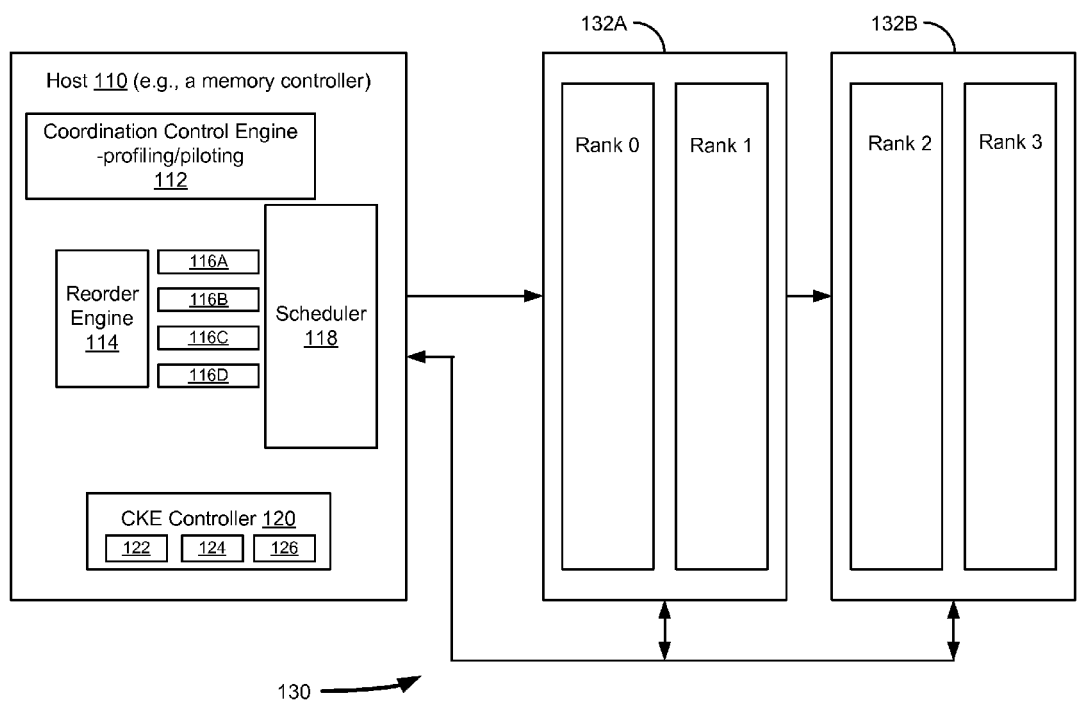
FIG. 1 is a block diagram illustrating selected aspects of a computing system implemented according to an embodiment of the invention.

FIG. 1 is a high-level block diagram illustrating selected aspects of a computing system implemented according to an embodiment of the invention. In the illustrated embodiment, system 100 includes host 110 (e.g., a memory controller) and memory channel 130. For ease of discussion, FIG. 1 shows a single memory channel 130 having two memory modules 132 each of which includes two ranks of memory (e.g., rank 0 through rank 3). It is to be appreciated that system 100 may include more than one memory channel 130 and memory channel 130 may include a different number of modules which may, in turn, include a different number of ranks. More generally, in alternative embodiments, system 100 may include more elements, fewer elements, and/or different elements.

Memory modules 132 may be any of a wide variety of memory modules including, for example, dual inline memory modules (DIMMs). The term "rank" broadly refers to a set of memory devices sharing the same chip select signal. In some embodiments, each rank includes one or more synchronous dynamic random access memory devices (SDRAMs). It is to be appreciated that modules 132 and one or more of ranks 0-3 may include elements that are not illustrated FIG. 1 as they are peripheral to embodiments of the invention (e.g., registers, serial presence detect, and the like).

Host 110 controls the transfer of data to and from memory channel 130. In some embodiments, host 110 is integrated onto the same die as one or more processors. In alternative embodiments host 110 is part of the chipset for system 100. In the illustrated embodiment, host 110 includes coordination control engine 112, reorder engine 114, request queues 116, scheduler 118, and CKE controller 120. In alternative embodiments, host 110 includes more elements, fewer elements, and/or different elements than those illustrated in FIG. 1.

Coordination control engine 112 includes logic to dynamically determine a dwell period for the ranks in memory channel 130. The term "dwell period" refers to a period of time that host 110 interacts with a selected rank while throttling the remaining ranks. Reorder engine 114 determines the order of the requests that are queued in request queues 116. Request queues 116 include the request (e.g., reads, writes, etc.) that are queued for ranks 0-3. For ease of illustration, FIG. 1 shows four request queues 116 (e.g., one per rank). It is to be appreciated, however, that host 110 may include more queues or fewer queues depending on the implementation of a given host. Scheduler 118 schedules the issuance of the requests queued in request queues 116.

Coordination control engine 112 implements an algorithm to dynamically control the length of the dwell period. In some embodiments, the goals of the algorithm are to harvest the maximum number of CKE-off cycles while remaining within a given performance degradation envelope. The algorithm may be implemented in hardware and an external agent may set the performance degradation envelope.

The provision of the performance degradation envelope by an external agent may be useful because different workloads exercise different memory throughputs at maximum system utilization. Consider, for example, a workload with high latency-sensitivity and moderately low bandwidth. Such a workload might only exercise a maximum channel throughput of 25% of its theoretical maximum (e.g. a channel capable of sustaining 12.8 GB/s might only be called upon to sustain 3.2 GB/s, or 25%, when the system is running at its peak). Its latency-sensitivity might be 0.5% of performance degradation for every additional nanosecond of average latency increase. With a latency-degradation target of 0.2% at maximum utilization, there is little opportunity for rank coordination. Thus, dwell time may be kept near zero. So such a workload may harvest little from rank coordination.

In contrast, consider a low latency-sensitivity workload with a medium-to-high bandwidth. Such a workload might exercise as much as 80% of available memory channel utilization at maximum system utilization. At 80% CPU utilization (~64% channel utilization) or less, where allowable performance degradation is in the 1% range, rank coordination will perform very nicely. However, if the regulator is saddled with the one-size-fits-all *do no harm* degradation envelope of 0.2% from the previous example, then it may not be able to harvest those gains.

While engine 112 can hit a performance degradation target, it may not know, sua sponte, what throughput corresponds to maximum system utilization. Hence, its performance degradation targets may be set externally by an agent that has this information.

In some embodiments, the algorithm disengages dwell control for short "profiling" or "pilot" windows. During these windows, it measures "profile" throughput on the memory channel. Outside of these windows, it measures "usage" throughput with the dwell control engaged. At the end of a relatively long "usage" window (embedded within the short profiling windows), the usage throughput is compared to the profile throughput. In general, the usage throughput will (probably) be lower than the profile throughput. The question is whether it is low enough or lower than it should be. If it is not low enough (e.g., it is not consuming the allowable performance degradation envelope), then the dwell time may be increased. If it is a little lower than it should be, the dwell time may be decreased a little. If it is a lot lower than it should be, then the dwell time may be decreased a lot.

In some embodiments, the usage window duration is on the order of four million memory cycles. Since profiling windows effective kill rank control power savings, their over-all duration may be kept to a tiny fraction of total time. In some embodiments, the hardware implementation employs either ~1% or ~2% for profile duration. The profile may be sliced up into multiple pieces which may be randomly distributed throughout the usage window such that their combined "weight" is 1-2%. In some embodiments, the number of slices is eight. The use of random distribution is an attempt at attenuating resonances. In some embodiments, the pilot throughput is averaged across multiple usage windows.

In some embodiments, in addition to being able to tune the performance degradation target for engine 112, the algorithm also has a throughput cutout. When the usage throughput exceeds that threshold (or cutout), it kills rank coordination (e.g., effectively sets the dwell to zero).

CKE controller 120 includes logic to control the assertion and de-assertion of CKE to each of ranks 0-3. In the illustrated embodiment, CKE controller 120 includes CKE timer logic 122, CKE off predictor logic 124, and CKE on predictor logic 126. In alternative embodiments, CKE controller 120 includes more elements, fewer elements, and/or different elements.

CKE timer logic 122 supports a conventional feature in which CKE is allowed to linger in the on state for many cycles after the in-flight transactions to a rank have completed. In some embodiments, if all of the pending requests are scheduled for a particular rank, then CKE controller 120 reverts to the conventional CKE timer technique. The reason for this is that predictor logic 124 and 126 are unlikely to save power, if all of the pending requests are scheduled for a particular rank.

In some embodiments, for each rank, predictor logic 124 predicts whether the next request is not going to be scheduled to the rank. Similarly, for each rank, predictor logic 126 predicts whether the next request is going to be scheduled to the rank. Each of logic 124 and 126 evaluates a number of conditions to formulate its respective prediction. These conditions, as discussed below, use the terms "this," "the other," and another when referring to ranks. The term "this rank" refers to the rank which will toggle its CKE signal. The term "the other rank" refers to the rank that the scheduler will continue scheduling. The term "another rank" includes "the other rank" but excludes "this rank."

In some embodiments, predictor logic 124 predicts whether the next request will not be scheduled to "this rank." This prediction may be done for every rank (e.g., in parallel). In addition, this prediction may be done on a cycle-by-cycle basis. Predictor logic 124 may formulate its prediction by evaluating one or more conditions. These conditions may include, for example, whether the other rank has not reached its electrical-throttling limit (e.g., tFAW).

In some embodiments, if all of the conditions are true, then a pending transaction to this rank will not be scheduled next. In some embodiments, when the conditions are true and all in-flight transactions to "this rank" have completed in this cycle, then CKE is de-asserted to "this rank."

In some embodiments, predictor logic 126 predicts whether the next request will be scheduled to "this rank." This prediction may be done for every rank (e.g., in parallel). In addition, this prediction may be done on a cycle-by-cycle basis. Predictor logic 126 may formulate its prediction by evaluating one or more conditions. These conditions may include, for example, whether the previously scheduled request to this channel went to another rank and whether a request is pending to this rank.

In some embodiments, if all of the conditions are true, then there is a very high probability that a pending transaction to "this rank" will be scheduled next. In such embodiments, if all of the conditions are valid, then "this rank's" CKE is asserted.

Figure 2:
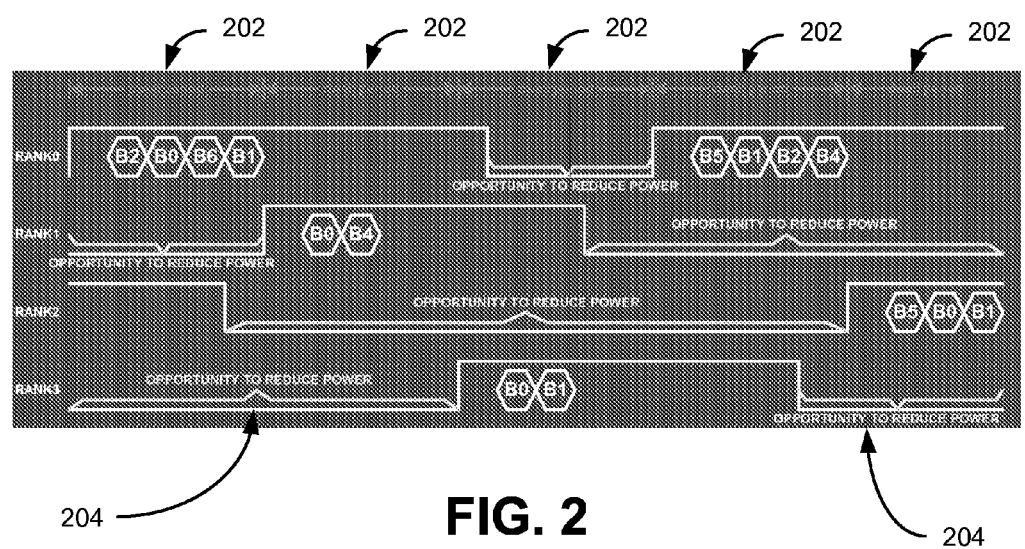
FIG. 2 is a high-level timing diagram illustrating selected aspects of rank coordination according to an embodiment of the invention.

FIG. 2 is a high-level timing diagram illustrating selected aspects of rank coordination according to an embodiment of the invention. In some embodiments, a coordination control engine (e.g., engine 112, shown in FIG. 1) selects a dwell period (e.g., 202) that enables power savings (e.g., by de-asserting CKE to at least some of the ranks that are not selected) while maintaining performance within a performance degradation envelop. The opportunities to reduce power are illustrated by, for example, reference number 204.

Figure 3:
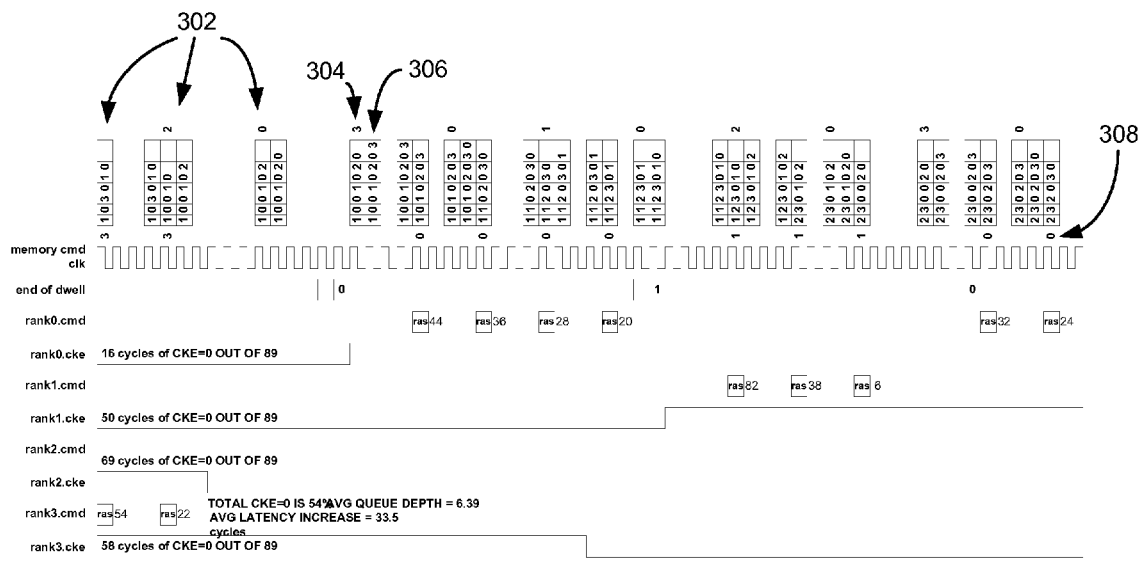
FIG. 3 is a more detailed timing diagram illustrating selected aspects of rank coordination according to an embodiment of the invention.

FIG. 3 is a more detailed timing diagram illustrating selected aspects of rank coordination according to an embodiment of the invention. The request queue is illustrated at the top of diagram 300 (e.g., at 302). A request destined for the queue but that has not yet entered the queue appears above the queue (e.g., at 304). In the next cycle, when the request enters the queue, it is shown at the tail of the queue (e.g., 306). Requests exit from the head of the queue at the bottom coincident with the scheduling of a "RAS" on the rank (e.g., at 308). The number to the right of each RAS is the number of additional cycles of latency that were incurred due to rank coordination. In the illustrated embodiment, the average channel utilization is about 66%.

Figure 4:
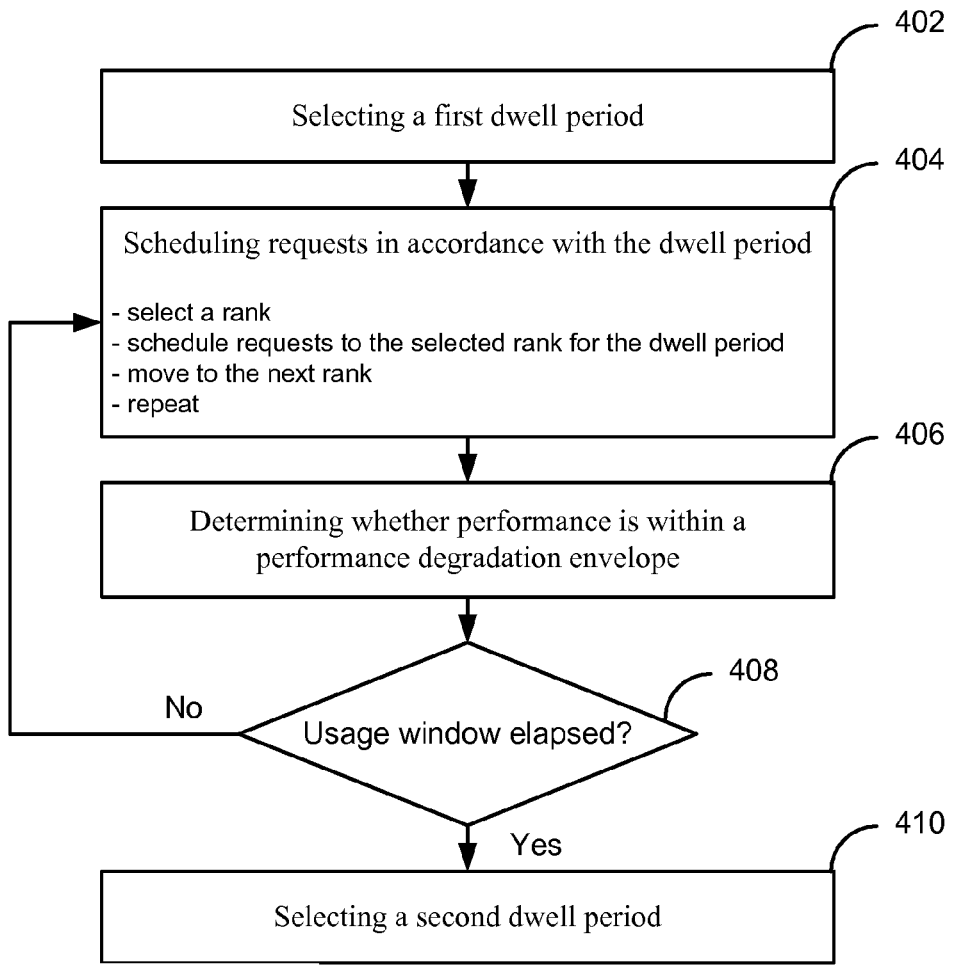
FIG. 4 is a flow diagram illustrating selected aspects of a method for rank coordination according to an embodiment of the invention.

FIG. 4 is a flow diagram illustrating selected aspects of a method for rank coordination according to an embodiment of the invention. Referring to process block 402, a coordination control engine (e.g., engine 112, shown in FIG. 1) selects a first dwell period. The length of the first dwell period may be determined by an algorithm that uses profiling to select a dwell period that reduces power consumption while remaining within a performance degradation envelope.

Referring to process block 404, the scheduler (e.g., scheduler 118, shown in FIG. 1) sequentially schedules requests for each rank for a dwell period. That is, each dwell period, a rank is selected and requests are scheduled for that rank. Once the dwell period transpires, another rank is selected and requests are scheduled for the other rank. This process may be repeated over the course of a usage window.

In some embodiments, the engine determines (e.g., during the usage window) whether an appropriate balance is maintained between power savings and performance (at 406). In some embodiments, coincident with (or subsequent to) the expiration of the usage window, the engine determines a new (e.g., second) dwell period. The second dwell period may be based on the results of the profiling algorithm.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   a scheduler to schedule requests for one or ranks in a memory channel; and
   rank coordination logic coupled with the scheduler, the rank coordination logic including
   performance measurement logic to measure a performance of a memory channel, and
   dwell period control logic to select a length of a dwell period based, at least in part, on the performance of the memory channel.

2. The integrated circuit of claim 1, wherein the performance measurement logic comprises profiling logic to measure the performance of the memory channel.

3. The integrated circuit of claim 2, wherein the profiling logic is to periodically determine an impact of the dwell period on the performance of the memory channel.

4. The integrated circuit of claim 3, wherein the dwell period control logic is to increase the dwell period if the impact of the dwell period on the performance of the memory channel is within a given performance degradation envelop.

5. The integrated circuit of claim 3, wherein the dwell period control logic is to decrease the dwell period if the impact of the dwell period on the performance of the memory channel exceeds a given performance degradation envelop.

6. The integrated circuit of claim 1, wherein the dwell period specifies how long the scheduler may scheduler requests to a selected rank and not schedule requests to any other ranks.

7. The integrated circuit of claim 6, further comprising throttle logic to throttle requests to any rank other than the selected rank.

8. The integrated circuit of claim 1, wherein the integrated circuit comprises a memory controller.

9. The integrated circuit of claim 1, wherein the integrated circuit further comprises a processor.

10. A method comprising:
    selecting a first dwell period, the first dwell period to define how long a scheduler may schedule requests to selected ranks of memory and not schedule requests to other ranks on a memory channel;
    measuring a performance of the memory channel to determine a performance impact associated with the first dwell period; and
    determining a second dwell period based, at least in part, on the performance impact associated with the first dwell period.

11. The method of claim 10, wherein the second dwell period is less than the first dwell period if the performance impact associated with the first dwell period exceeds a given performance degradation envelop.

12. The method of claim 10, wherein the second dwell period is greater than the first dwell period if the performance impact associated with the first dwell period does not exceed a given performance degradation envelop.

13. The method of claim 10, further comprising:
    selecting a set of ranks;
    scheduling one or more requests for the set of ranks during the first dwell period;
    throttling other ranks on the memory channel, except the set of ranks; and
    selecting other ranks responsive to the expiration of the first dwell period.

14. A system comprising:
    a memory channel including a plurality of ranks; and
    a memory controller coupled with the memory channel, the memory controller including
    a scheduler to schedule requests for the plurality of ranks; and
    rank coordination logic coupled with the scheduler, the rank coordination logic including
    performance measurement logic to measure a performance of the memory channel, and dwell period control logic to select a length of a dwell period based, at least in part, on the performance of the memory channel.

15. The system of claim 14, wherein the performance measurement logic comprises profiling logic to measure the performance of the memory channel.

16. The system of claim 15, wherein the profiling logic is to periodically determine an impact of the dwell period on the performance of the memory channel.

17. The system of claim 16, wherein the dwell period control logic is to increase the dwell period if the impact of the dwell period on the performance of the memory channel is within a given performance degradation envelope.

18. The system of claim 16, wherein the dwell period control logic is to decrease the dwell period of the impact of the dwell period on the performance of the memory channel exceeds a given performance degradation envelop.

19. The system of claim 14, wherein the dwell period specifies how long the scheduler may schedule requests to selected ranks and not schedule requests to other ranks.

20. The integrated circuit of claim 19, further comprising throttle logic to throttle requests to any rank other than the selected rank.

* * * * *